(12) United States Patent
Sun et al.

(10) Patent No.: US 11,307,453 B2
(45) Date of Patent: Apr. 19, 2022

(54) DISPLAY PANEL AND DISPLAY DEVICE

(71) Applicant: Wuhan China Star Optoelectronics Technology Co., Ltd., Wuhan (CN)

(72) Inventors: Yuan Sun, Wuhan (CN); Chao Wang, Wuhan (CN); Guanghui Liu, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/620,034

(22) PCT Filed: Sep. 30, 2019

(86) PCT No.: PCT/CN2019/109298
§ 371 (c)(1),
(2) Date: Dec. 6, 2019

(87) PCT Pub. No.: WO2020/220576
PCT Pub. Date: Nov. 5, 2020

(65) Prior Publication Data
US 2022/0050329 A1    Feb. 17, 2022

(30) Foreign Application Priority Data

Apr. 29, 2019   (CN) .......................... 201910353766.0

(51) Int. Cl.
*G02F 1/1335*   (2006.01)
*G02F 1/13357*   (2006.01)
*G02F 1/1339*   (2006.01)

(52) U.S. Cl.
CPC ...... *G02F 1/133603* (2013.01); *G02F 1/1339* (2013.01); *G02F 1/133504* (2013.01); *G02F 1/133531* (2021.01)

(58) Field of Classification Search
CPC ................................................ G02F 1/133603
See application file for complete search history.

(56) References Cited

U.S. PATENT DOCUMENTS

| 10,845,630 B2 * | 11/2020 | Li ..................... G02F 1/133514 |
| 11,057,556 B2 * | 7/2021 | Chen ..................... H04N 5/2257 |
| 2017/0251137 A1 | 8/2017 | Evans et al. |

FOREIGN PATENT DOCUMENTS

| CN | 106292017 | 1/2017 |
| CN | 208384291 | 1/2019 |

(Continued)

*Primary Examiner* — Edmond C Lau

(57) ABSTRACT

A display panel and a display device are provided. The display panel includes a display area including a transparent display area and an opaque display area surrounding the transparent display area. In the display area, the display panel also includes a backlight and a liquid crystal display panel. The backlight includes a first through hole corresponding to the transparent display area. The liquid crystal display panel is disposed over the backlight. The liquid crystal display panel includes a driving layer and a liquid crystal layer. The driving layer includes a first driving circuit and a second driving circuit. The liquid crystal layer includes a first liquid crystal region corresponding to the transparent display area and a second liquid crystal region corresponding to the opaque display area. The first driving circuit corresponds to the first liquid crystal region. The second driving circuit corresponds to the second liquid crystal region.

10 Claims, 3 Drawing Sheets

(56) References Cited

FOREIGN PATENT DOCUMENTS

| CN | 109379465 | 2/2019 |
| CN | 109541849 | 3/2019 |
| CN | 109976061 | 7/2019 |

\* cited by examiner

DISPLAY PANEL AND DISPLAY DEVICE

FIELD OF DISCLOSURE

The present disclosure relates to the field of displays, and in particular to a display panel and a display device.

BACKGROUND

Smart terminals such as mobile phones and tablet computers are becoming an indispensable part of people's daily life due to their convenience, entertainment, and functional diversity. With the continuous development of display technology, applications of more advanced technologies on smart terminals have greatly enriched people's lives. At the same time, people's requirements and expectations for smart terminals are getting higher and higher. While enjoying basic functions brought by smart terminals such as mobile phones and tablet computers, people also put forward higher requirements for smart terminals, such as a full-screen design of smart terminals.

Full-screen technology is a broader definition of a mobile phone design for ultra-high screen-to-body ratio in a display industry. Literally, a front of the phone is occupied by the screen. A display interface of the mobile phone is completely covered by the screen, and four borders of the mobile phone are all designed with no borders, thereby achieving an ultra-high screen-to-body ratio of nearly 100%. However, it is limited by basic functions that are indispensable for mobile phones such as a front camera, an earpiece, a distance sensor, and a light sensor, so that at present, there is a notch in an upper part of the screen of the mobile display device to dispose the above functional components. The industry-recognized full-screen display is only a display device with an ultra-high screen-to-body ratio, rather than a display device with a screen-to-body ratio of 100%. This is so-called "bangs screen" or "water drop screen". This affects an overall attractive appearance of the terminal intelligent terminal. Alternatively, in the prior art, a basic functional component is placed by other mechanical structures, for example, by a structure such as a lifting camera to realize a full-screen display. However, the display device with the lifting camera has disadvantages of being non-waterproof, having a low lifespan, being easily damaged, and low quality user experience. Therefore, there is a need for a technical solution that can also reduce or eliminate an influence of the camera on the screen-to-body ratio and increase the screen-to-body ratio.

SUMMARY OF DISCLOSURE

An object of the present disclosure is to provide a display panel and a display device, which two different liquid crystal display technologies to solve the problems that a screen-to-body ratio of a mobile display device in the prior art cannot reach 100%, a real full-screen cannot be realized, and an overall attractive appearance is not good.

In order to achieve the above object, the present disclosure provides a display panel including: a display area including a transparent display area and an opaque display area surrounding the transparent display area.

In the display area, the display panel also includes a backlight and a liquid crystal display panel. The backlight includes a first through hole corresponding to the transparent display area. The liquid crystal display panel is disposed over the backlight.

The liquid crystal display panel includes a driving layer and a liquid crystal layer. The driving layer includes a first driving circuit and a second driving circuit. The liquid crystal layer is disposed on the driving layer and includes a first liquid crystal region and a second liquid crystal region. The first liquid crystal region corresponds to the transparent display area. The second liquid crystal region corresponds to the opaque display area. The first driving circuit corresponds to the first liquid crystal region and is configured to provide a driving signal for the first liquid crystal region. The second driving circuit corresponds to the second liquid crystal region and is configured to provide another driving signal for the second liquid crystal region.

Furthermore, the liquid crystal display panel also includes a first light source disposed on a side of the liquid crystal display panel adjacent to the first liquid crystal region. The driving layer also includes a third driving circuit which corresponds to the first light source and is configured to provide a corresponding driving signal for the first light source.

Furthermore, the first light source includes an organic light-emitting diode light source.

Furthermore, the first liquid crystal region is filled with scattering liquid crystal.

Furthermore, in the display area, the display panel also includes a second light source disposed on a side of the backlight adjacent to the second liquid crystal region.

Furthermore, the second light source includes a light-emitting diode light source.

Furthermore, in the display area, the display panel also includes a first polarizer and a a second polarizer. The first polarizer is disposed between the backlight and the liquid crystal display panel. The first polarizer includes a second through hole corresponding to the transparent display area. The second polarizer is disposed on a side of the liquid crystal display panel away from the first polarizer. The second polarizer includes a third through hole corresponding to the transparent display area.

Furthermore, the liquid crystal display panel also includes a first substrate, a second substrate, and a sealant layer. The first substrate is disposed on a side of the driving layer away from the liquid crystal layer. The second substrate is disposed on a side of the liquid crystal layer away from the driving layer. The sealant layer disposed on edges of the first substrate and the second substrate. There is a gap between the sealant layer and the liquid crystal layer, and the first light source is disposed within the gap.

The present disclosure also provides a display device including any one of the display panel as described above.

Furthermore, the display device also includes a camera disposed on a side of the display panel adjacent to the backlight and corresponding to the transparent display area.

Advantages of the present disclosure are as follows. A display panel and a display device of the present disclosure combine two different liquid crystal display technologies, and a display panel is divided into a transparent display area and an opaque display area. When a camera is turned on, the transparent display area is in a transparent state, which can provide a light channel for the camera. When the camera is turned off, the transparent display area can display an image normally, thereby improving a screen-to-body ratio, realizing a full-screen display, reducing an influence of the camera positioned under the screen and the like on the display panel, improving an overall attractive appearance of the display device, and enhancing quality of user experience.

BRIEF DESCRIPTION OF DRAWINGS

In order to illustrate the technical solutions according to the embodiments of the present disclosure more clearly, the accompanying drawings for describing the embodiments are introduced briefly in the following. Apparently, the accompanying drawings in the following description are only some embodiments of the present disclosure, and persons of ordinary skill in the art may derive other drawings from the accompanying drawings without creative efforts.

Figure 1:
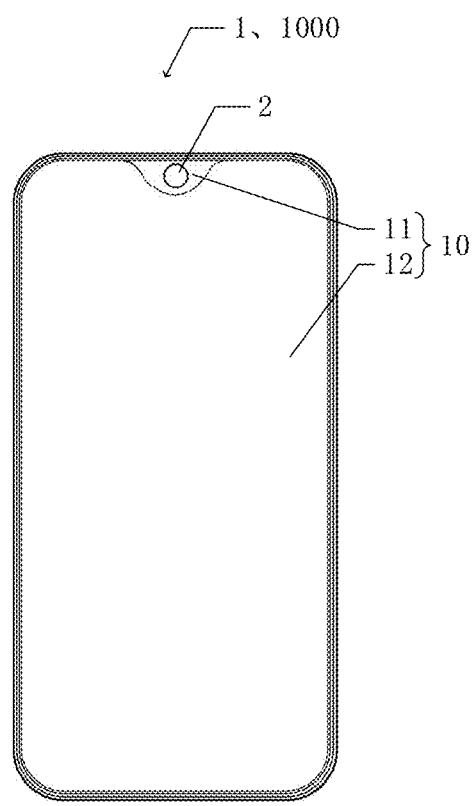
FIG. 1 is a main view of a display panel of an embodiment of the present disclosure.

Reference numerals of components in the drawings are as follow.

display panel 1;
camera 2;
display area 10;
transparent display area 11;
opaque display area 12;
backlight 100;
first through hole 101;
first polarizer 200;
second through hole 201;
liquid crystal display panel 300;
liquid crystal layer 310;
first liquid crystal region 311;
second liquid crystal region 312;
driving layer 320;
first driving circuit 321;
second driving circuit 322;
third driving circuit 323;
first substrate 330;
second substrate 340;
sealant layer 350;
first light source 360;
second polarizer 400;
third through hole 401;
second light source 500;
display device 1000

DETAILED DESCRIPTION

Preferred embodiments of the present disclosure will be introduced with reference to appended drawings as follows to demonstrate that the present disclosure may be implemented. The embodiment of the present disclosure can be fully introduced to those skilled in the art to make technical contents more clear and easy to understand. The present disclosure can be embodied in many different forms of embodiment, and the scope of protection of the present disclosure is not limited to the embodiments set forth herein.

In the accompanying drawings, structurally identical components are designated by the same reference numerals, and structurally or functionally similar components throughout are designated by similar numerical reference numerals. The dimensions and thicknesses of each component shown in the drawings are arbitrarily shown. The size and thickness of each component are not limited, and for the sake of clarity, the thickness of the components is exaggerated somewhat in some places in the drawings.

Furthermore, the following descriptions of the various embodiments are made with reference to the accompanying drawings for illustrating, in an exemplary way, specific embodiments to which the present disclosure is applicable. Directional terminology, such as "up", "down", "front", "rear", "left", "right", "internal", "external", and "side", used in the present disclosure are described according to the direction shown in the drawings and are not intended to indicate or suggest a designated device or component must be of a specific direction or be constructed or operated in a specific direction and thus they should not be construed as constraint to the scope of the present disclosure. In addition, terms such as "first", "second", and "third" are used herein for purposes of description and are not intended to indicate or imply relative importance.

When a component is described to be "on" the other component, the component may be directly disposed on the other component; alternatively, an intervening component may exist, the component is disposed on the intervening component, and the intervening component is disposed on the other component. When a component is described to be "installed on" or "connected to" the other component, it may be understood that the component is directly "installed" or "connected" to each other, alternatively it is understood that one component is "installed" or "connected" to the other component through an intervening component.

As shown in FIG. 1, an embodiment of the present disclosure provides a display panel 1. The display panel 1 includes a display area 10. The display area 10 includes a transparent display area 11 and an opaque display area 12. The opaque display area 12 surrounds the transparent display area 11.

Figure 2:
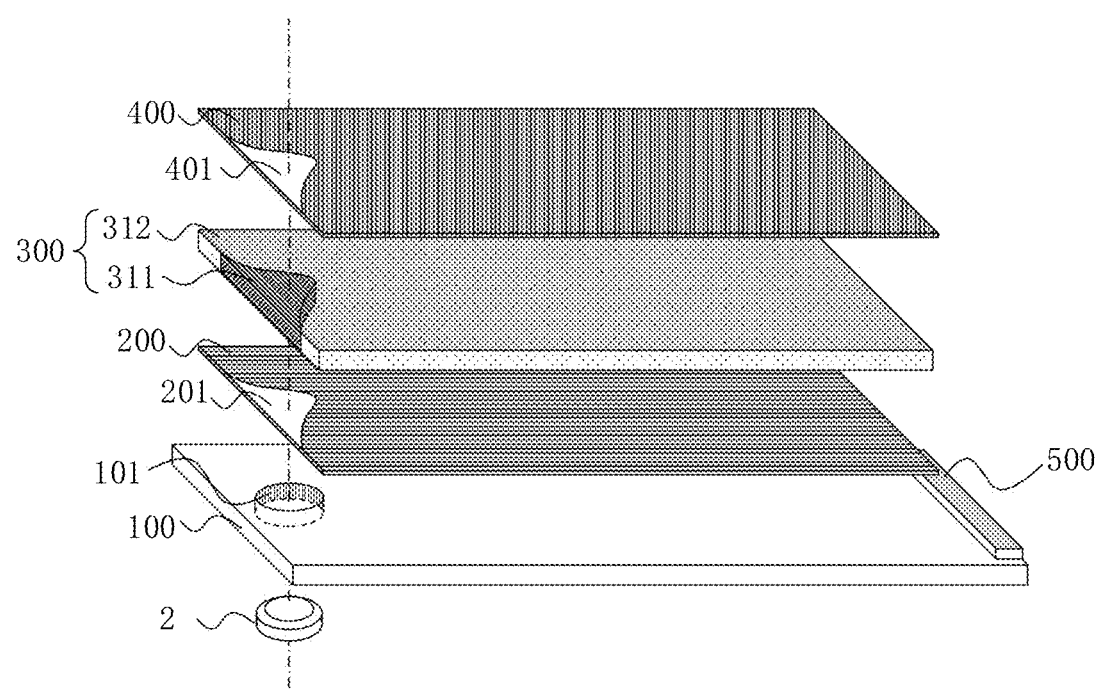
FIG. 2 is a schematic diagram of partial components of the display panel of the embodiment of the present disclosure.

As shown in FIG. 2, in the display area 10, the display panel 1 also includes a backlight 100 and a liquid crystal display panel 300.

The liquid crystal display panel 300 is disposed over the backlight 100 and includes a liquid crystal layer 310, a driving layer 320, and a first light source 360.

The liquid crystal layer 310 includes a first liquid crystal region 311 and a second liquid crystal region 312.

The first liquid crystal region 311 is filled with scattering liquid crystal, and it corresponds to the transparent display area 11. The scattering liquid crystal can cause disordered movement of liquid crystal molecules by changing external conditions such as electric field, voltage, current, frequency, etc., thereby changing the sequence and the angle of the liquid crystal molecules in the first liquid crystal region 311. Thus, a refractive index of the liquid crystal molecules is changed, and an incident light entering the first liquid crystal region 311 is scattered. The first liquid crystal region 311 realizes display of an image in the transparent display area 11 by the scattering liquid crystal. Moreover, when a component positioned under the screen, such as a camera 2 or the like, is operated, the transparent display area 11 presents a transparent state. The scattering liquid crystal does not shield the light from entering the component positioned under the screen, such as the camera 2.

The second liquid crystal region 312 is filled with a conventional liquid crystal, which corresponds to the opaque display area 12. The conventional liquid crystal may change its electric field or voltage to cause its liquid crystal molecules to move, so that the sequence of the liquid crystal molecules in the second liquid crystal region 312 is changed, thereby controlling whether an incident light entering the second liquid crystal region 312 passes through or not. The second liquid crystal region 312 realizes display of an image in the opaque display area 12 by the conventional liquid crystal.

Figure 3:
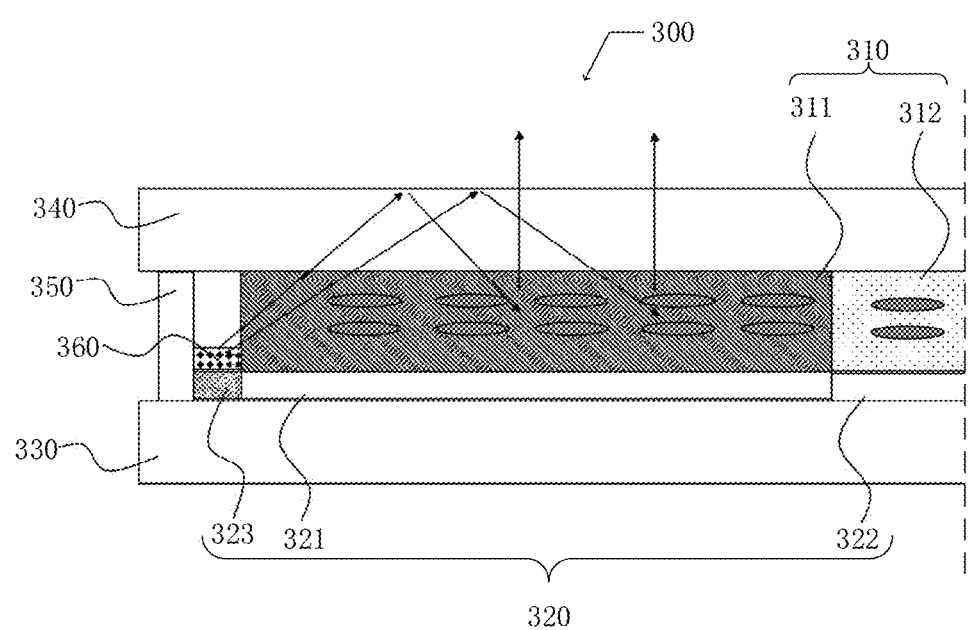
FIG. 3 is a schematic diagram of a layer structure of a liquid crystal display panel of the embodiment of the present disclosure.

As shown in FIG. 3, the first light source 360 is disposed on a side of the liquid crystal display panel 300 adjacent to the first liquid crystal region 311, and the first light source 360 includes an organic light-emitting diode (OLED) light source. Since the OLED has characteristics such as full-color light-emitting, it is configured to provide a color light source for the first liquid crystal region 311.

The driving layer 320 is disposed under the liquid crystal layer 310 and includes a first driving circuit 321, a second driving circuit 322, and a third driving circuit 323.

The first driving circuit 321 corresponds to the first liquid crystal region 311, and it may be one of liquid crystal display drive circuits such as a fringe-field switching (FFS) drive circuit, an in-plane switching (IPS) drive circuit, a vertical alignment liquid crystal (VA) drive circuit, a twisted nematic liquid crystal (TN) drive circuit, etc. The first driving circuit 321 is configured to provide a driving signal for the first liquid crystal region 311, and drive the scattering liquid crystal filled in the first liquid crystal region 311 according to requirements, and change a sequence, an angle, a light transmittance, and a refractive index of the liquid crystal molecular, thereby realizing a conversion of displaying an image or rendering transparent in the transparent display area 11.

The second driving circuit 322 corresponds to the second liquid crystal region 312, and it may be a thin film transistor (TFT) type driving circuit or may be another driving circuit. The second driving circuit 322 is configured to provide a driving signal for the second liquid crystal region 312, drive the conventional liquid crystal filled in the second liquid crystal region 312, change a sequence of the liquid crystal molecules, and control an image display in the opaque display area 12.

The third driving layer 323 corresponds to the first light source 360, and it is a field timing driving circuit, and is configured to provide a driving signal for the first light source 360 to control a light emission of the organic light-emitting diode.

In this embodiment, the liquid crystal display panel 300 omits a polarizer in the prior art, and the first driving circuit 321 has a high aperture, so that light can easily pass through the first driving circuit 321 and enter a next layer structure.

As shown in FIG. 3, the liquid crystal display panel 300 also includes a first substrate 330, a second substrate 340, and a sealant layer 350. The first substrate 330 is disposed on a side of the driving layer 320 away from the liquid crystal layer 310. The second substrate 340 is disposed on a side of the liquid crystal layer 310 away from the driving layer 320. The sealant layer 350 is disposed at edges of the first substrate 330 and the second substrate 340, and encloses a sealed chamber with the first substrate 330 and the second substrate 340. The liquid crystal layer 310, the driving layer 320, and the first light source 360 are located in the chamber. There is a gap between the sealant layer 350 and the liquid crystal layer 310. The first light source 360 is disposed within the gap. The chamber protects each device of the liquid crystal display panel 300 in a sealed space for isolating the device from the outside water and oxygen, thereby preventing a corrosion of each display device by water and oxygen, and increasing a lifespan of the liquid crystal display panel 300.

In the liquid crystal display panel 300 of the transparent display area 11, the first light source 360 emits colored light into the scattering liquid crystal of the first liquid crystal region 311 through the third driving circuit 323, and the light enters an interior of the liquid crystal by a reflection of the first substrate 330 and the second substrate 340. When an image needs to be displayed, the first driving circuit 321 achieves scattering of color light by controlling rotation of the scattering liquid crystal such that light is vertically emitted from the first substrate 330, thereby displaying the image. When it is required to present transparency, the scattering liquid crystal is rendered in a transparent state by controlling the first driving circuit 321, so as to obtain a light channel.

The backlight 100 has a first through hole 101, and the first through hole 101 corresponds to the transparent display area 11. The first through hole 101 provides a light channel for a component positioned under the screen, such as the camera 2. The backlight 100 has a plurality of optical films, such as one or more of optical films consisting of a reflective sheet, a light guide plate, a diffuser, and a brightness enhancement sheet. Through a cooperation of the plurality of optical films, the backlight 100 can reduce a loss of the light source and increase an axial brightness of the display panel 1 by improving an angular distribution of the light, guiding a direction of light scattering, evening the light, and concentrating the light to a frontal angle without increasing a number of light sources.

As shown in FIG. 2, a second light source 500 is disposed on a side of the backlight 100 adjacent to the second liquid crystal region 312. The second light source 500 is a light emitting diode (LED) light source that provides a light to the second liquid crystal region 312 through the backlight 100. In a liquid crystal display (LCD) device 1000, the liquid crystal display panel 300 is a passive illuminating element, which is not illuminated by itself, but is illuminated by a backlight module below it, so that the second light source 500 and the backlight 100 constitute a backlight module for providing the light to the second liquid crystal region 312.

As shown in FIG. 2, the display panel 1 also includes a first polarizer 200 and a second polarizer 400. The first polarizer 200 is disposed between the backlight 100 and the liquid crystal display panel 300. The first polarizer 200 has a second through hole 201 corresponding to the transparent display area 11. The second polarizer 400 is disposed on a side of the liquid crystal display panel 300 away from the first polarizer 200, and has a third through hole 401 corresponding to the transparent display area 11. The second through hole 201 and the third through hole 401 provide a light channel for the component positioned under the screen, such as the camera 2 or the like. Polarizers (POLs) are called light-polarizing plates and are used to control a polarization direction of a particular beam. When a natural light passes through the polarizer, the light whose vibration direction is perpendicular to a transmission axis of the polarizer is absorbed, and only a polarized light whose vibration direction is parallel to the transmission axis of the polarizer passes through. In the display panel 1, the first polarizer 200 and the second polarizer 400 are respectively attached to two sides of the liquid crystal display panel 300, and the first polarizer 200 is configured to convert the light beams generated by the backlight 100 and the second light source 500 into a polarized light. The second polarizer 400 is used to analyze the polarized light electrically modulated by the liquid crystal to produce a contrast between light and dark, thereby displaying the image.

An embodiment of the present invention also provides a display device 1000. The display device 1000 is a liquid crystal display device, and includes the display panel 1 and the camera 2 as described above. The camera 2 is disposed on a side of the display panel 1 adjacent to the backlight 100 and corresponds to the transparent display area 11. A size of the camera 2 can be adjusted according to a size of the transparent display area 11, thereby optimizing a space occupied by the camera 2. The display device 1000 exhibits a full-screen display, and may be any product or component having a display function such as a mobile phone, a tablet computer, a notebook computer, or the like.

The display panel 1 and the display device 1000 are provided in the embodiments of the present disclosure. The display area 110 of the display panel 1 is divided into the transparent display area 11 and the opaque display area 12. The opaque display area 12 is a conventional display area, and uses a conventional liquid crystal technology. The display technology used in the transparent display area 11 is a scattering liquid crystal display technology. When the camera 2 is turned on, the transparent display area 11 is in a transparent state, so that the camera 2 can be provided with a light channel. When the camera 2 is turned off, the transparent display area 11 can display an image normally. The display panel 1 and the display device 1000 in the embodiments of the present disclosure combine two liquid crystal display technologies. Dual functions of display and light transmission in the transparent display area 111 corresponding to the camera 200 are implemented by using the scattering liquid crystal display technology, so as to eliminate an influence of the camera 2 on the display panel 1, such that a screen-to-body ratio of the display panel 1 can be 100%, thereby realizing a real full-screen display, improving the attractive appearance of the display device 1000, and enhancing quality of user experience.

In this embodiment, the transparent display area 11 is a "a" shape as shown in FIG. 1, however, in other embodiments of the present disclosure, the transparent display area 11 may also have other shapes such as a circular shape, an elliptical shape, a square shape, a teardrop shape, and the like. The layer structure is similar to the display panel 11 and the display device 1000 in this embodiment, and is not described here again. All other embodiments obtained by a person of ordinary skill in the art based on the embodiments of the present application without departing from the inventive scope are within the scope of the present application.

The present disclosure has been described with reference to preferred embodiments, which are only embodiments for illustrating the principle and application of the present disclosure. It should be understood that various modifications and variants to the present disclosure may be made by anyone skilled in the art, without departing from the scope and spirit of the present disclosure. It should be noted that various dependent claims and technical features described herein may be combined with one another in any different manner from the original claims. It should also be understood that the technical features described in view of a single embodiment can also be applied to other embodiments.

What is claimed is:

1. A display panel, comprising: a display area comprising a transparent display area and an opaque display area surrounding the transparent display area, wherein in the display area, the display panel further comprises:
    a backlight comprising a first through hole, wherein the first through hole corresponds to the transparent display area; and
    a liquid crystal display panel disposed over the backlight, wherein the liquid crystal display panel comprises:
        a driving layer comprising a first driving circuit and a second driving circuit; and
        a liquid crystal layer disposed on the driving layer, wherein the liquid crystal layer comprises a first liquid crystal region and a second liquid crystal region;
    wherein the first liquid crystal region corresponds to the transparent display area;
    wherein the second liquid crystal region corresponds to the opaque display area;
    wherein the first driving circuit corresponds to the first liquid crystal region and is configured to provide a driving signal for the first liquid crystal region; and
    wherein the second driving circuit corresponds to the second liquid crystal region and is configured to provide another driving signal for the second liquid crystal region.

2. The display panel as claimed in claim 1, wherein the liquid crystal display panel further comprises:
    a first light source disposed on a side of the liquid crystal display panel adjacent to the first liquid crystal region; and
    the driving layer further comprising a third driving circuit, wherein the third driving circuit corresponds to the first light source and is configured to provide a corresponding driving signal for the first light source.

3. The display panel as claimed in claim 2, wherein the first light source comprises an organic light-emitting diode light source.

4. The display panel as claimed in claim 1, wherein the first liquid crystal region is filled with scattering liquid crystal.

5. The display panel as claimed in claim 1, wherein in the display area, the display panel further comprises a second light source disposed on a side of the backlight adjacent to the second liquid crystal region.

6. The display panel as claimed in claim 5, wherein the second light source comprises a light-emitting diode light source.

7. The display panel as claimed in claim 1, wherein in the display area, the display panel further comprises:
    a first polarizer disposed between the backlight and the liquid crystal display panel; and
    a second polarizer disposed on a side of the liquid crystal display panel away from the first polarizer;
    wherein the first polarizer comprises a second through hole corresponding to the transparent display area; and
    wherein the second polarizer comprises a third through hole corresponding to the transparent display area.

8. The display panel as claimed in claim 1, wherein the liquid crystal display panel further comprises:
    a first substrate disposed on a side of the driving layer away from the liquid crystal layer;
    a second substrate disposed on a side of the liquid crystal layer away from the driving layer; and
    a sealant layer disposed on edges of the first substrate and the second substrate;
    wherein there is a gap between the sealant layer and the liquid crystal layer, and the first light source is disposed within the gap.

9. A display device, comprising the display panel according to claim 1.

10. The display device as claimed in claim 9, further comprising a camera disposed on a side of the display panel adjacent to the backlight and corresponding to the transparent display area.

* * * * *